(12) United States Patent
Fujimura

(10) Patent No.: US 7,683,562 B2
(45) Date of Patent: Mar. 23, 2010

(54) CHATTERING PREVENTING CIRCUIT, WAVEFORM SHAPING CIRCUIT INCLUDING CHATTERING PREVENTING CIRCUIT, AND THREE-PHASE MOTOR DRIVE CONTROL CIRCUIT INCLUDING WAVEFORM SHAPING CIRCUIT

(75) Inventor: Takashi Fujimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 416 days.

(21) Appl. No.: 11/664,073

(22) PCT Filed: Oct. 6, 2005

(86) PCT No.: PCT/JP2005/018532

§ 371 (c)(1),
(2), (4) Date: Mar. 26, 2007

(87) PCT Pub. No.: WO2006/041005

PCT Pub. Date: Apr. 20, 2006

(65) Prior Publication Data

US 2008/0106231 A1 May 8, 2008

(30) Foreign Application Priority Data

Oct. 15, 2004 (JP) ............................ 2004-302311

(51) Int. Cl.
  *H02K 29/08* (2006.01)
(52) U.S. Cl. ................................ 318/400.38; 318/432
(58) Field of Classification Search ............ 318/400.38, 318/400.39, 400.4, 432, 434, 632
See application file for complete search history.

(56) References Cited

U.S. PATENT DOCUMENTS

| 5,004,981 A | * | 4/1991 | Hashimoto et al. ...... 324/207.22 |
| 5,153,513 A | * | 10/1992 | Adachi ................... 324/207.25 |
| 6,281,657 B1 | * | 8/2001 | Matsuo ....................... 318/705 |
| 2005/0110444 A1 | * | 5/2005 | Hassan et al. ............... 318/376 |

FOREIGN PATENT DOCUMENTS

| JP | 05-176585 | 7/1993 |
| JP | 06-169586 | 6/1994 |
| JP | 09-247948 | 9/1997 |
| JP | 2002-010676 | 1/2002 |

* cited by examiner

*Primary Examiner*—Rina I Duda
(74) *Attorney, Agent, or Firm*—Fish & Richardson P.C.

(57) ABSTRACT

An object of the present invention is to provide a chattering preventing circuit, a waveform shaping circuit, and a motor drive control circuit including the chattering preventing circuit or the waveform shaping circuit, to provide an FG signal free from noise caused by chattering, without using a hysteresis comparator.

10 Claims, 7 Drawing Sheets

CHATTERING PREVENTING CIRCUIT, WAVEFORM SHAPING CIRCUIT INCLUDING CHATTERING PREVENTING CIRCUIT, AND THREE-PHASE MOTOR DRIVE CONTROL CIRCUIT INCLUDING WAVEFORM SHAPING CIRCUIT

TECHNICAL FIELD

The present invention relates to a chattering preventing circuit preventing chattering, a waveform shaping circuit suitable for shaping a waveform of a motor rotational position signal using the chattering preventing circuit, and a three-phase motor drive control circuit detecting the number of rotations using the waveform shaping circuit.

BACKGROUND ART

A three-phase motor drive control circuit with a Hall element controls the timing of motor driving based on a motor rotational position signal produced in the Hall element. In addition, some three-phase motor drive control circuits generate a rotation number pulse signal, so-called FG signal, indicating the number of rotations from the rotational position signal and adjust the timing of motor driving using the number of rotations information obtained from the FG signal (see, for example, Japanese Patent Laying-Open No. 6-169586 (Patent Document 1)). FIG. 6 is a circuit diagram of a motor device including a conventional motor drive control circuit. FIG. 6 shows a motor device 101 including such a motor drive control circuit 102.

This motor device 101 includes Hall elements HU, HV, HW detecting a position of a rotor of a motor to output rotational position signals, motor drive control circuit 102 outputting a control signal based on these rotational position signals and a command from a motor control command portion (not shown), and a power driver 103 supplying driving current to coils LU, LV, LW of the motor in response to the control signal from motor drive control circuit 102. It is noted that the rotational position signal is a three-phase sinusoidal signal formed of differential U-phase rotational position signals $HU^+$ and $HU^-$ output by Hall element HU, differential V-phase rotational position signals $HV^+$ and $HV^-$ output by Hall element HV, and differential W-phase rotational position signals $HW^+$ and $HW^-$ output by Hall element W. The phase difference between phases is 120°.

Motor drive control circuit 102 has a power driver control circuit 109, a rotation number pulse signal generation circuit 117, and a waveform shaping circuit 110 formed of U-phase, V-phase, W-phase comparators 111, 112, 113 provided at a stage prior to rotation number pulse signal generation circuit 117. Power driver control circuit 109 receives rotational position signals $HU^+$, $HU^-$, $HV^+$, $HV^-$, $HW^+$, $HW^-$, a command signal from the motor control command portion (not shown) and a rotation number pulse signal FG of rotation number pulse signal generation circuit 117 as described later to output a control signal to power driver 103. The command signal from the motor control command portion is input to power driver control circuit 109 through an input terminal TO. U-phase comparator 111 compares differential U-phase rotational position signals $HU^+$ and $HU^-$ to output a pulse signal HU2 as the comparison result. V-phase comparator 112 compares differential V-phase rotational position signals $HV^+$ and $HV^-$ to output a pulse signal HV2 as the comparison result. W-phase comparator 113 compares differential W-phase rotational position signals $HW^+$ and $HW^-$ to output a pulse signal HW2 as the comparison result. The foregoing rotation number pulse signal generation circuit 117 combines pulse signals HU2, HV2, HW2 to generate rotation number pulse signal FG and output the rotation number pulse signal FG to power driver control circuit 109.

Here, U-phase, V-phase, W-phase comparators 111, 112, 113 have hysteresis, and the noise superimposed on rotational position signals $HU^+$, $HU^-$, $HV^+$, $HV^-$, $HW^+$, $HW^-$ is removed if its magnitude is within a prescribed voltage width, that is, a hysteresis width. Thus, such a phenomenon, that is, chattering is prevented to some extent in that the outputs of comparators 111, 112, 113 become unstable to produce minute pulses when they are switched from a high level to a lower level or from a low level to a high level, and therefore, in rotation number pulse signal generation circuit 117 receiving them, generation of erroneous rotation number pulse signal FG can be suppressed.

Patent Document 1: Japanese Patent Laying-Open No. 6-169586

DISCLOSURE OF THE INVENTION

Problems to be Solved by the Invention

The hysteresis width, however, has variations due to variations among products and temperatures and thus needs to be set large with a sufficient margin for the potential noises. On the other hand, as the rotational speed of the motor becomes lower, the amplitude of the rotational position signal becomes smaller and approximates to the hysteresis width. Accordingly, the lower the applicable rotational speed is, it becomes more difficult to set an appropriate hysteresis width. For example, today, it is contemplated to rotate a spindle motor of an optical disk device at a super-low speed (for example 50 rpm), and it has been difficult to set a hysteresis width that is effective for the noise superimposed on the rotational position signal having such an extremely small amplitude.

Therefore, a filter element may be added to a line transmitting the rotational position signal to reduce the noise itself In this approach, however, the rotational position signal is delayed, and the accuracy in driving the motor at the optimum timing is decreased. In addition, the costs are increased.

The present invention is made in view of the foregoing situation. An object of the present invention is to provide a motor drive control circuit in which generation of an erroneous rotation number pulse signal is suppressed by preventing chattering caused by a noise in a certain range without delaying a rotational position signal even when the rotational speed of a motor is reduced.

Means for Solving the Problems

In accordance with the present invention, in summary, a chattering preventing circuit receives first and second pulse signals having the same frequency. The chattering preventing circuits holds a level of an output changed in response to a first rising of the first pulse signal when a level of the second pulse signal is a prescribed level, and holds a level of the output changed again in response to a first falling of the first pulse signal when a level of the second pulse signal is a level opposite to the prescribed level. Accordingly, the chattering preventing circuit prevents chattering of the output.

In accordance with another aspect of the present invention, a waveform shaping circuit includes: a first comparator generating and outputting a first pulse signal from a first-phase sinusoidal signal; a second comparator generating and outputting a second pulse signal from a second-phase sinusoidal signal; and a chattering preventing circuit receiving the first and second pulse signals and preventing chattering of an output. The chattering preventing circuit holds a level of an output changed in response to a first rising of the first pulse signal when a level of the second pulse signal is a prescribed level, and holds a level of the output changed again in response to a first falling of the first pulse signal when a level of the second pulse signal is a level opposite to the prescribed level, thereby preventing chattering of the output.

In accordance with a further aspect of the present invention, a waveform shaping circuit includes: a first comparator generating and outputting a first pulse signal from a first-phase rotational position signal; a second comparator generating and outputting a second pulse signal from a second-phase rotational position signal; and a first chattering preventing circuit receiving the first and second pulse signals and preventing chattering of a first output. The first chattering preventing circuit holds a level of the first output changed in response to a first rising of the first pulse signal when a level of the second pulse signal is a prescribed level, and holds a level of the first output changed again in response to a first falling of the first pulse signal when a level of the second pulse signal is a level opposite to the prescribed level.

Preferably, the waveform shaping circuit further includes a third comparator, a second chattering preventing circuit, and a third chattering preventing circuit. The third comparator generates and outputs a third pulse signal from a third-phase rotational position signal. The second chattering preventing circuit holds a level of a second output changed in response to a first rising of the second pulse signal when a level of the third pulse signal is the prescribed level, and holds a level of the second output changed again in response to a first falling of the second pulse signal when a level of the third pulse signal is a level opposite to the prescribed level. The third chattering preventing circuit holds a level of a third output changed in response to a first rising of the third pulse signal when the second pulse signal is at the prescribed level, and holds a level of the third output changed again in response to a first falling of the third pulse signal when the second pulse signal is at a level opposite to the prescribed level.

In accordance with yet another aspect of the present invention, a three-phase motor drive control circuit includes a power driver control circuit and a waveform shaping circuit. The power driver control circuit receives first-phase, second-phase and third-phase rotational position signals of a three-phase motor, a command signal, and a rotation number pulse signal indicating a number of rotations, and outputting a control signal for motor drive. The waveform shaping circuit shapes waveforms of the first-phase, second-phase and third-phase rotational position signals. The waveform shaping circuit includes a first comparator, a second comparator, and a first chattering preventing circuit. The first comparator generates and outputs a first pulse signal from the first-phase rotational position signal. The second comparator generates and outputs a second pulse signal from the second-phase rotational position signal. The first chattering preventing circuit receives the first and second pulse signals and prevents chattering of a first output signal. The first chattering preventing circuit holds a level of the first output signal changed in response to a first rising of the first pulse signal when a level of the second pulse signal is a prescribed level, and holds a level of the first output signal changed again in response to a first falling of the first pulse signal when a level of the second pulse signal is a level opposite to the prescribed level. The three-phase motor drive control circuit further includes a rotation number pulse signal generation circuit. The rotation number pulse signal generation circuit generates a rotation number pulse signal from the first output signal of the first chattering preventing circuit for output to the power driver control circuit.

Preferably, the waveform shaping circuit further includes a third comparator, a second chattering preventing circuit, and a third chattering preventing circuit. The third comparator generates and outputs a third pulse signal from the three-phase rotational position signal. The second chattering preventing circuit holds a level of a second output signal changed in response to a first rising of the second pulse signal when a level of the third pulse signal is the prescribed level, and holds a level of the second output signal changed again in response to a first falling of the second pulse signal when a level of the third pulse signal is a level opposite to the prescribed level. The third chattering preventing circuit holds a level of a third output signal changed in response to a first rising of the third pulse signal when the second pulse signal is at the prescribed level, and holds a level of the third output signal changed again in response to a first falling of the third pulse signal when the second pulse signal is at a level opposite to the prescribed level.

More preferably, the rotation number pulse signal generation circuit generates the rotation number pulse signal additionally using the second and third output signals.

Preferably, the first-phase, second-phase and third-phase rotational position signals are signals output by first, second and third Hall elements, respectively.

Preferably, the three-phase motor drive control circuit further includes a rotational direction signal generation circuit generating a rotational direction signal indicating a rotational direction of the motor at least from the first and second output signals.

Preferably, the three-phase motor drive control circuit further includes a rotational direction signal generation circuit generating a rotational direction signal indicating a rotational direction of the motor at least from the first and second output signals.

More preferably, the first-phase, second-phase and third-phase rotational position signals are signals output by first, second and third Hall elements, respectively.

Preferably, the three-phase motor drive control circuit further includes a rotational direction signal generation circuit generating a rotational direction signal indicating a rotational direction of the motor at least from the first and second output signals.

More preferably, the three-phase motor drive control circuit further includes a rotational direction signal generation circuit generating a rotational direction signal indicating a rotational direction of the motor at least from the first and second output signals.

Preferably, the first-phase, second-phase and third-phase rotational position signals are signals output by first, second and third Hall elements, respectively.

EFFECTS OF THE INVENTION

In accordance with the present invention, the chattering preventing circuit and the waveform shaping circuit including the chattering preventing circuit can reliably prevent chattering without being influenced by variations among products and temperatures even when a noise smaller than ½ of the amplitude is superimposed on a sinusoidal signal (rotational position signal). The three-phase motor drive control circuit in accordance with the present invention includes this waveform shaping circuit so that generation of a rotation number pulse signal indicating an erroneous number of rotations can be suppressed.

DESCRIPTION OF THE REFERENCE SIGNS

2 three-phase motor drive control circuit, 9 power driver control circuit, 10 waveform shaping circuit, 11 U-phase comparator, 12 V-phase comparator, 13 W-phase comparator, 14 U-phase chattering preventing circuit, 15 V-phase chattering preventing circuit, 16 W-phase chattering preventing circuit, 17 rotation number pulse signal generation circuit, $HU^+$ positive U-phase rotational position signal, $HU^-$ negative U-phase rotational position signal, $HV^+$ positive V-phase rotational position signal, $HV^-$ negative V-phase rotational position signal, $HW^+$ positive W-phase rotational position signal, $HW^-$ negative W-phase rotational position signal, HU2 U-phase pulse signal, HV2 V-phase pulse signal, HW2 W-phase pulse signal, FG rotation number pulse signal, TO input terminal.

BEST MODES FOR CARRYING OUT THE INVENTION

Figure 1:
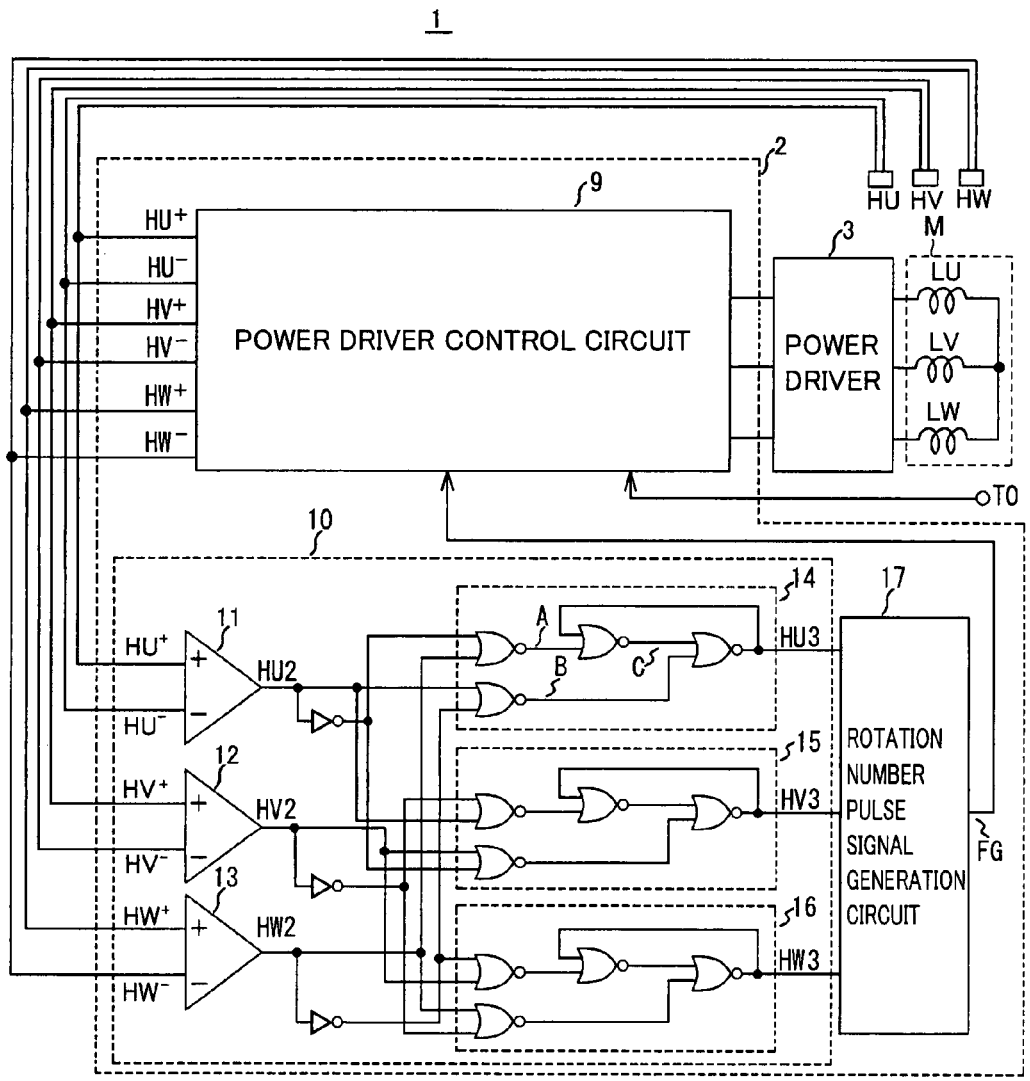
FIG. 1 is a circuit diagram of a motor device including a motor drive control circuit 2 in accordance with an embodiment of the present invention.

In the following, the best mode for carrying out the invention will be described with reference to the figures. FIG. 1 is a circuit diagram of a motor device including a motor drive control circuit 2 in accordance with an embodiment of the present invention. This motor device 1 includes Hall elements HU, HV, HW detecting a position of a rotor of a motor M to output rotational position signals, a motor drive control circuit 2 outputting a control signal based on these rotational position signals and a command from a motor control command portion (not shown), and a power driver 3 supplying driving current to coils LU, LV, LW of motor M in response to the control signal from motor drive control circuit 2. It is noted that the rotational position signal is a three-phase sinusoidal signal formed of a positive U-phase rotational position signal $HU^+$ and a negative U-phase rotational position signal $HU^-$ which are differential signals output by Hall element HU, a positive V-phase rotational position signal $HV^+$ and a negative V-phase rotational position signal $HV^-$ which are differential signals output by Hall element HV, and a positive W-phase rotational position signal $HW^+$ and a negative W-phase rotational position signal $HW^-$ which are differential signals output by Hall element HW. The phase difference between the phases is 120°.

Figure 6:
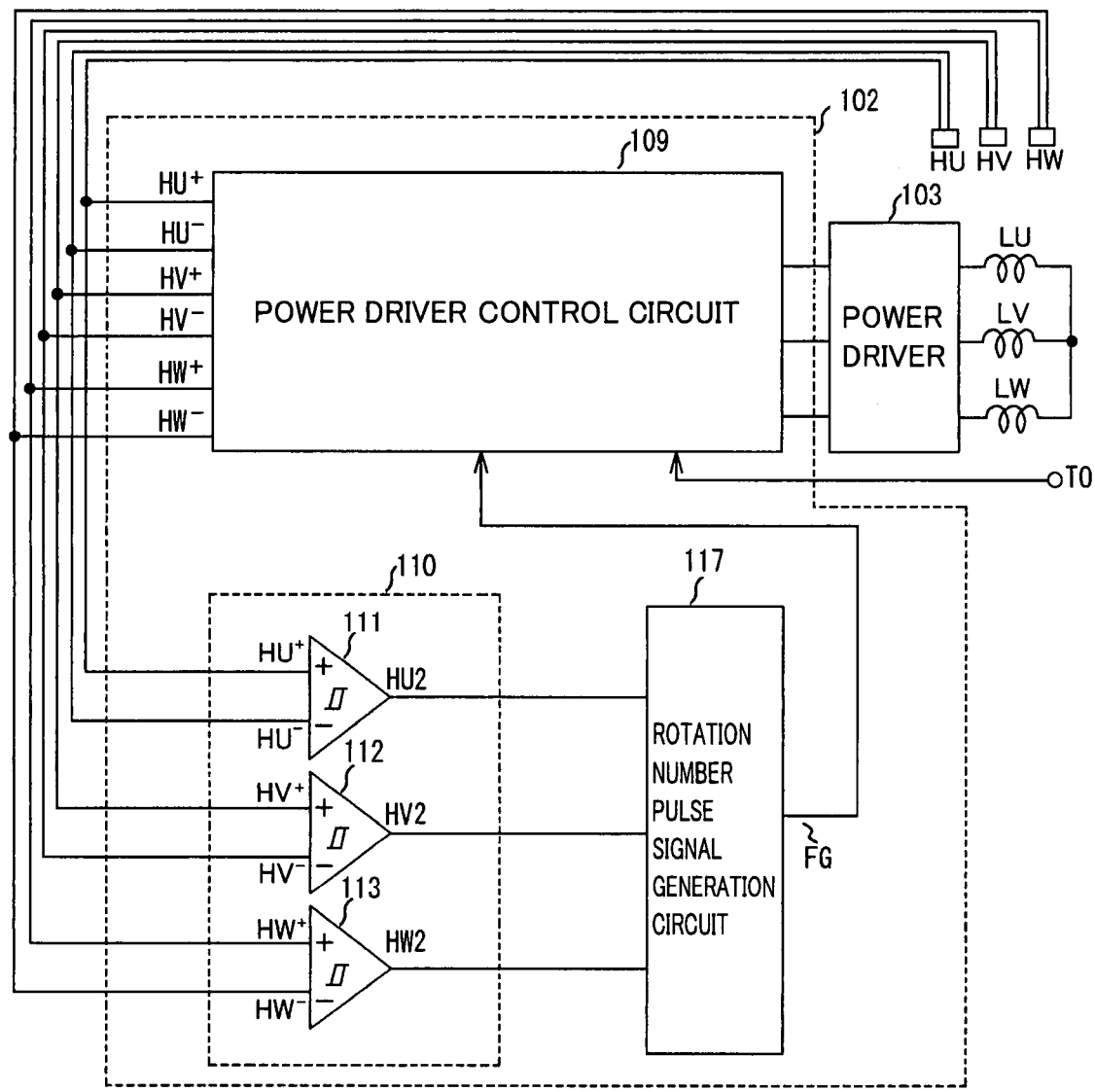
FIG. 6 is a circuit diagram of a motor device including a conventional motor drive control circuit.

In the following, motor drive control circuit 2 will be described more specifically; Motor drive control circuit 2 has a power driver control circuit 9, a rotation number pulse signal generation circuit 17, and a waveform shaping circuit 10 including U-phase, V-phase, W-phase comparators 11, 12, 13 provided at a stage prior to rotation number pulse signal generation circuit 17. Power driver control circuit 9 receives rotational position signals $HU^+$, $HU^-$, $HV^+$, $HV^-$, $HW^+$, $HW^-$ as described above, a command signal from the motor control command portion (not shown), and rotation number pulse signal FG of rotation number pulse signal generation circuit 17 as described later to output a control signal to power driver 3. The command signal from the motor control command portion is input to power driver control circuit 9 through an input terminal TO. This configuration is substantially similar to the one shown in FIG. 6 in the background art. This motor drive control circuit 2 is characterized in that chattering preventing circuits 14, 15, 16 as detailed later are provided at the stage subsequent to U-phase, V-phase, W-phase comparators 11, 12, 13 in waveform shaping circuit 10. More specifically, the control signal of power driver control circuit 9 controls the timing of motor driving through power driver 3 based on rotational position signals $HU^+$, $HU^-$, $HV^+$, $HV^-$, $HW^+$, $HW^-$ and controls the amount of supply of driving current through power driver 3 based on the command signal of the motor control command portion. The timing of motor driving is adjusted by rotation number pulse signal FG.

U-phase comparator 11 compares differential U-phase rotational position signals $HU^+$, $HU^-$ to output a high-level or low-level U-phase pulse signal HU2. V-phase comparator 12 compares differential V-phase rotational position signals $HV^+$, $HV^-$ to output a high-level or low-level V-phase pulse signal HV2. W-phase comparator 13 compares differential W-phase rotational position signals $HW^+$, $HW^-$ to output a high-level or low-level W-phase pulse signal HW2. It is noted that these comparators 11, 12, 13 do not have hysteresis.

U-phase chattering preventing circuit 14 receives U-phase pulse signal HU2, W-phase pulse signal HW2 and inversion signals thereof to output an output signal HU3. Output signal HU3 changes to a high level in response to the rising of U-phase pulse signal HU2 when W-phase pulse signal HW2 is at a low level. Thereafter, the level of output signal HU3 is held at the high level. Output signal HU3 changes to a low level in response to the falling of U-phase pulse signal HU2 when W-phase pulse signal HW2 is at a high level. Thereafter, the level of output signal HU3 is held at the low level. V-phase chattering preventing circuit 15 receives V-phase pulse signal HV2, U-phase pulse signal HU2 and inversion signals thereof to output an output signal HV3. Output signal HV3 changes to a high level in response to the rising of V-phase pulse signal HV2 when U-phase pulse signal HU2 is at a low level. Thereafter, the level of output signal HV3 is held at the high level. Output signal HV3 changes to a low level in response to the falling of V-phase pulse signal HV2 when U-phase pulse signal HU2 is at a high level. Thereafter, the level of output signal HV3 is held at the low level. W-phase chattering preventing circuit 16 receives W-phase pulse signal HW2, V-phase pulse signal HV2 and inversion signals thereof to output an output signal HW3. Output signal HW3 changes to a high level in response to the rising of W-phase pulse signal HW2 when V-phase pulse signal HV2 is at a low level. Thereafter, the level of output signal HW3 is held at the high level. Output signal HW3 changes to a low level in response to the falling of W-phase pulse signal HW2 when V-phase pulse signal HV2 is at a high level. Thereafter, the level of output signal HW3 is held at the low level. A specific circuit configuration of these three phase chattering preventing circuits 14, 15, 16 will be detailed later.

Rotation number pulse signal generation circuit 17 receives the respective output signals HU3, HV3, HW3 of three phase chattering preventing circuits 14, 15, 16 to generate rotation number pulse signal FG. Rotation number pulse signal FG rises in synchronization with the rising of any of signals HU3, HV3, HW3 and falls in synchronization with the falling thereof. Rotation number pulse signal FG is input to the aforementioned power driver control circuit 9.

Figure 2:
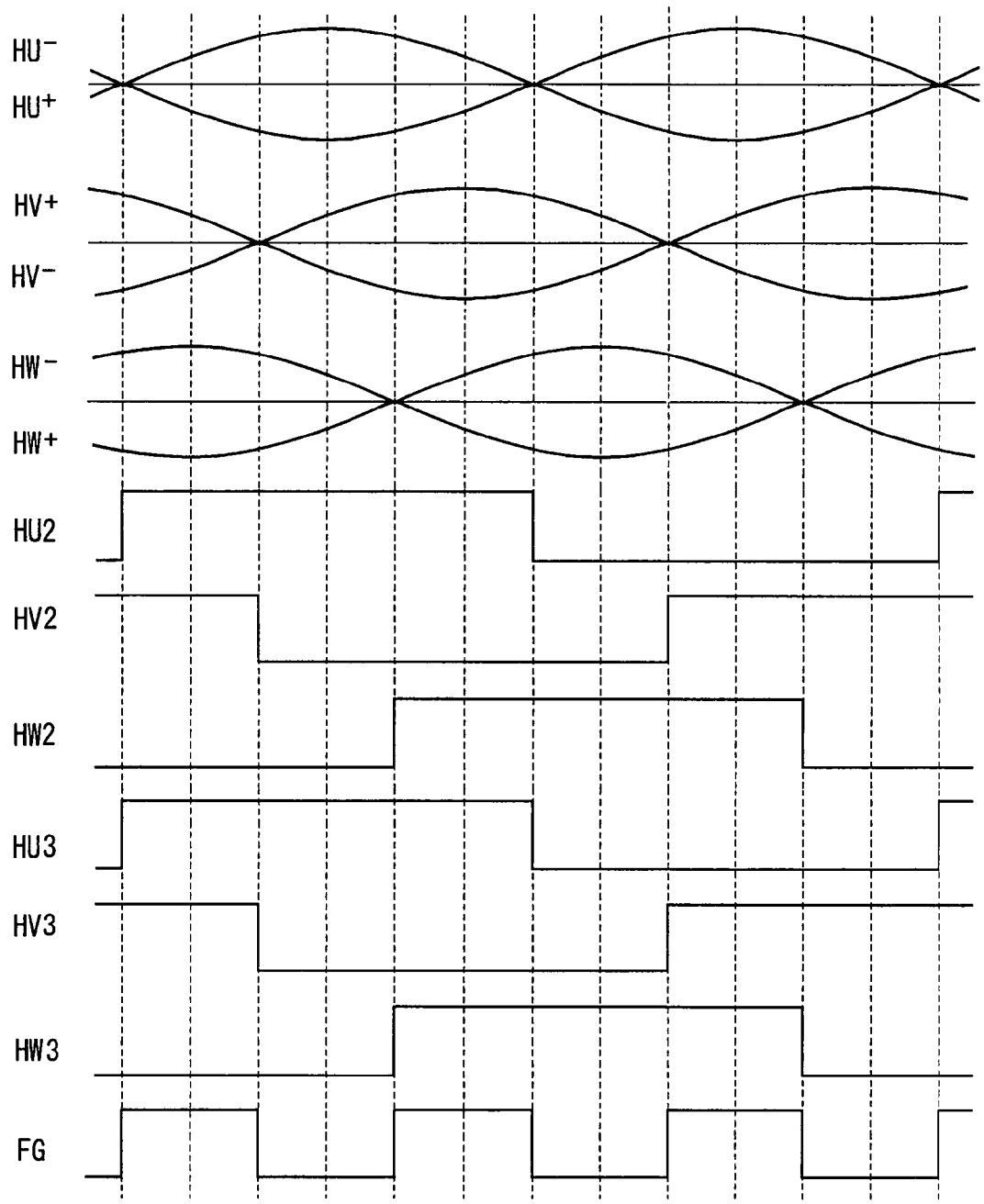
FIG. 2 is a diagram showing a waveform of each signal where no noise is superimposed on rotational position signals $HU^+$, $HU^-$, $HV^+$, $HV^-$, $HW^+$, $HW^-$.

The operations of three phase comparators 11, 12, 13, three phase chattering preventing circuits 14, 15, 16 and rotation number pulse signal generation circuit 17 will now be described. FIG. 2 shows a waveform of each signal where no noise is superimposed on rotational position signals $HU^+$, $HU^-$, $HV^+$, $HV^-$, $HW^+$, $HW^-$. Pulse signals HU2, HV2, HW2 rise or fall in response to the cross point of differential U-phase rotational position signals $HU^+$, $HU^-$, the cross point of differential V-phase rotational position signals $HV^+$, $HV^-$, and the cross point of differential W-phase rotational position signals $HW^+$, $HW^-$, respectively. Then, the waveforms of output signals HU3, HV3, HW3 of three phase chattering preventing circuits 14, 15, 16 become substantially equal to those of pulse signals HU2, HV2, HW2, respectively.

Figure 3:
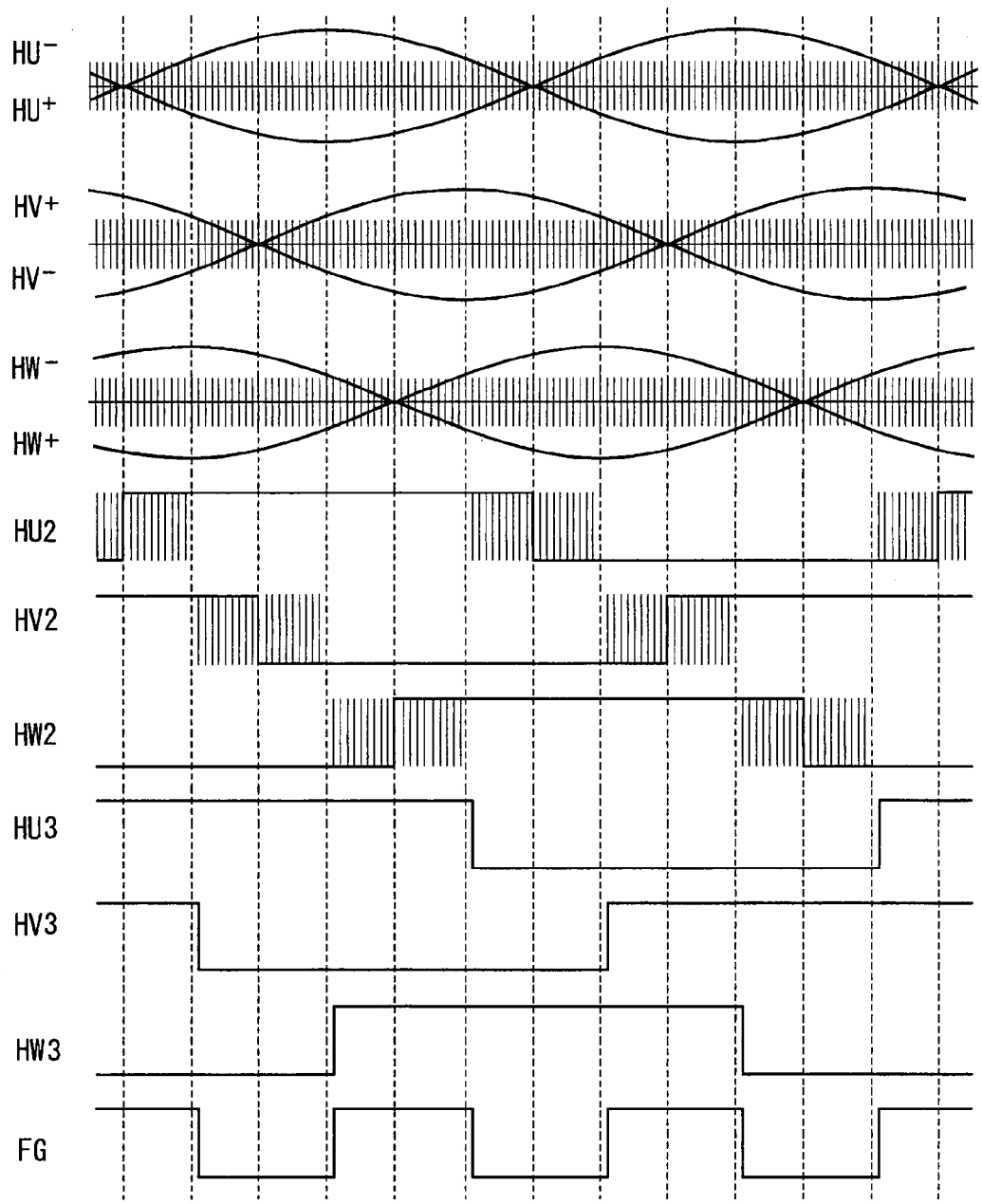
FIG. 3 is a diagram showing a waveform of each signal where noise close to ½ of the amplitude is superimposed on rotational position signals $HU^+$, $HU^-$, $HV^+$, $HV^-$, $HW^+$, $HW^-$.

FIG. 3 shows a waveform of each signal where a noise close to ½ of the amplitude is superimposed on rotational position signals $HU^+$, $HU^-$, $HV^+$, $HV^-$, $HW^+$, $HW^-$. First, it should be noted that a noise smaller than ½ of the amplitude of rotational position signals $HU^+$, $HU^-$, $HV^+$, $HV^-$, $HW^+$, $HW^-$ has an effect only on the range of electrical angle 30° prior to and subsequent to each cross point. In other words, in pulse signals HU2, HV2, HW2 which are the respective outputs of three phase comparators 11, 12, 13, chattering pulses may occur from the cross point to the point ahead of or behind electrical angle 30°.

U-phase chattering preventing circuit 14 detects only the first rising or the first falling of pulse signal HU2 in the range of electrical range 30° prior to and subsequent to the cross point of differential U-phase rotational position signals $HU^+$, $HU^-$. In the following, the specifics will be described. When pulse signal HU2 rises in the state where pulse signal HW2 is at a low level, U-phase chattering preventing circuit 14 allows pulse signal HU3 to rise and keeps the level of pulse signal HU3 at a high level Thereafter, when pulse signal HU2 falls in the state where pulse signal HW2 is at a high level, U-phase chattering preventing circuit 14 allows pulse signal HU3 to fall and keeps the level of pulse signal HU3 at a low level. This operation is performed irrespective of whether the rising or falling of pulse signal HU2 results from the cross point of differential U-phase rotational position signals $HU^+$, $HU^-$ or the chattering pulse. On the other hand, when pulse signal HU2 rises or falls, pulse signal HW2 is electrical angle 30° or greater away from the cross point of differential W-phase rotational position signals $HW^+$, $HW^-$ and therefore surely attains a high level or a low level, that is, is stable. In this way, U-phase chattering preventing circuit 14 outputs signal HU3 which rises or falls in the range of electrical angel 30° prior to and subsequent to the cross point of differential U-phase rotational position signals $HU^+$, $HU^-$. The frequency of this output signal HU3 is equal to the frequency of U-phase rotational position signals $HU^+$, $HU^-$. This applies to V-phase, W-phase chattering preventing circuits 15, 16.

Rotation number pulse signal FG rises in synchronization with the rising of any of output signals HU3, HV3, HW3 of three phase chattering preventing circuits 14, 15, 16 and falls in synchronization with the falling thereof Therefore, even if a noise close to ½ of the amplitude of rotational position signals $HU^+$, $HU^-$, $HV^+$, $HV^-$, $HW^+$, $HW^-$ is superimposed thereon, the frequency of rotation number pulse signal FG is three times the frequency thereof Then, in power driver control circuit 9, the timing of motor driving is adjusted based on this rotation number pulse signal FG.

It is noted that any of output signals HU3, HV3, HW3 can be output as it is as rotation number pulse signal FG in rotation number pulse signal generation circuit 17, although the response becomes slow when the number of rotations changes. In this case, one of three phase comparators 11, 12, 13 (for example V-phase comparator 12), two of three phase chattering preventing circuits 14, 15, 16 (for example, V-phase, W-phase chattering preventing circuits 15, 16) may be omitted.

Figure 5A:
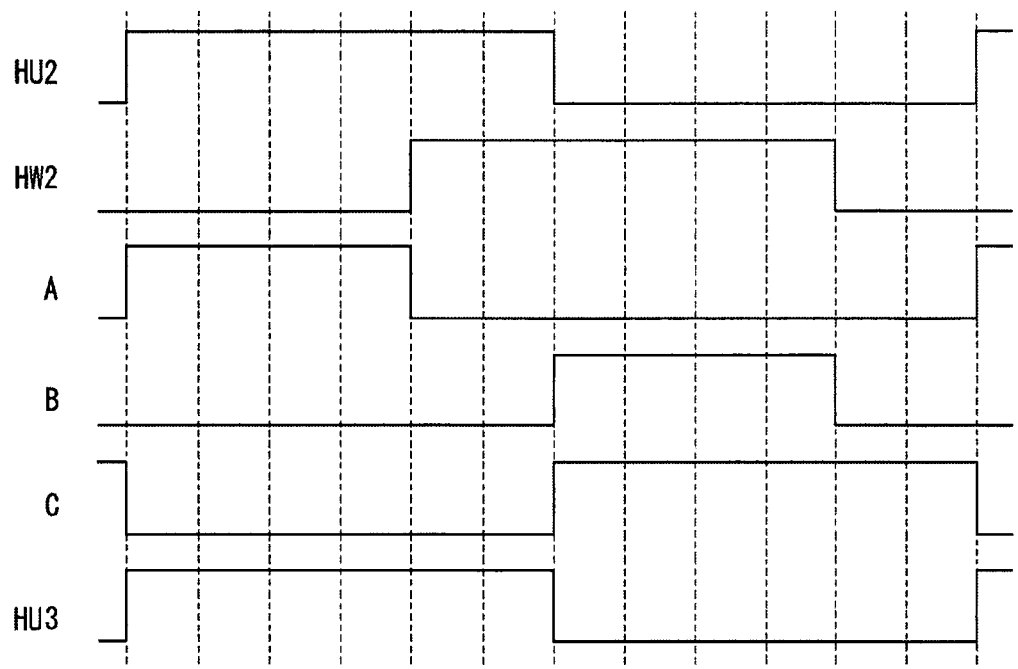
FIG. 5A is a waveform diagram illustrating an operation of a chattering preventing circuit during rotation of the motor shown in FIG. 2.

The specific circuit configuration of three phase chattering preventing circuits 14, 15, 16 will now be described. Specifically, each of three phase chattering preventing circuits 14, 15, 16 can be configured with a combination of NOR circuits as shown in FIG. 1. In U-phase chattering preventing circuit 14, a node A is a node receiving the NOR operation result of the inversion signal of pulse signal HU2 and pulse signal HW2, and a node B is a node receiving the NOR operation result of pulse signal HU2 and the inversion signal of pulse signal HW2. A node C is a node receiving the NOR operation result of an input at node A and output signal HU3. Output signal HU3 is the NOR operation result of an input at node B and an input at node C. In other words, as shown in FIG. 5A, the voltage at node A changes to a high level upon rising of pulse signal HU2 when pulse signal HW2 is at a low level, and the voltage at node B changes to a high level upon falling of pulse signal HU2 when pulse signal HW2 is at a high level. Furthermore, a low level period of electrical angle 60° is provided between the high level period of the voltage at node A and the high level period of the voltage at node B. When the voltage at node B changes to a high level, output signal HU3 changes to a low level. Furthermore, when output signal HU3 changes to a low level, the voltage at node C change to a high level so that the level of output signal HU3 is kept at a low level. When the voltage at node A changes to a high level, output signal HU3 changes to a high level since the voltage at node B at this point of time is at a low level. On the other hand, when output signal HU3 changes to a high level, the voltage at node C changes to a low level so that the level of output signal HU3 is kept at a high level. Therefore, output signal HU3 has a waveform as shown in FIG. 2 when no noise is superimposed on the rotational position signal, and it has a waveform as shown in FIG. 3 when a noise close to ½ of the amplitude is superimposed on the rotational position signal. This also applies to V-phase, W-phase chattering preventing circuits 15, 16.

It is noted that in three phase chattering preventing circuits 14, 15, 16, the similar logic can be realized by another circuitry as a matter of course, and the phases of output signals HU3, HV3, HW3 thereof can be advanced or delayed, or inverted as necessary. Furthermore, in stead of W-phase pulse signal HW2, a signal that rises or falls at a point electrical angle 60° or greater away from the cross point of differential U-phase rotational position signals $HU^+$, $HU^-$ may be input to U-phase chattering preventing circuit 14. For example, when V-phase pulse signal HV2 is at a high level, U-phase chattering preventing circuit 14 may change output signal HU3 to a high level in response to the rising of U-phase pulse signal HU2 and thereafter hold the level of output signal HU3 at a high level, and when V-phase pulse signal HV2 is at a low level, U-phase chattering preventing circuit 14 may change output signal HU3 to a low level in response to the falling of U-phase pulse signal HU2 and thereafter hold the level of output signal HU3 at a low level. This also applies to the circuit configuration of V-phase, W-phase chattering preventing circuits 15, 16.

As described above, three phase chattering preventing circuits 14, 15, 16 prevent chattering reliably, irrespective of the amplitude of the rotational position signal, even when a noise smaller than ½ of the amplitude thereof is superimposed on the rotational position signal. Accordingly, three phase comparators 11, 12, 13 need not have hysteresis susceptible to variations among products and temperatures. Thus, in accordance with the embodiment, generation of a rotation number pulse signal indicating an erroneous number of rotations can be suppressed. It is noted that in some motor devices, a noise larger than ½ of the amplitude of the rotational position signal may be superimposed on the rotational position signal. In this case, a method of reducing noise itself by adding a filter element to a line transmitting the rotational position signal may be used in combination. Also in this case, the time constant of the filter element can be decreased using this motor drive control circuit 2, so that the delay of the rotational position signal can be minimized and reduced accuracy of motor driving can be prevented.

Figure 4:
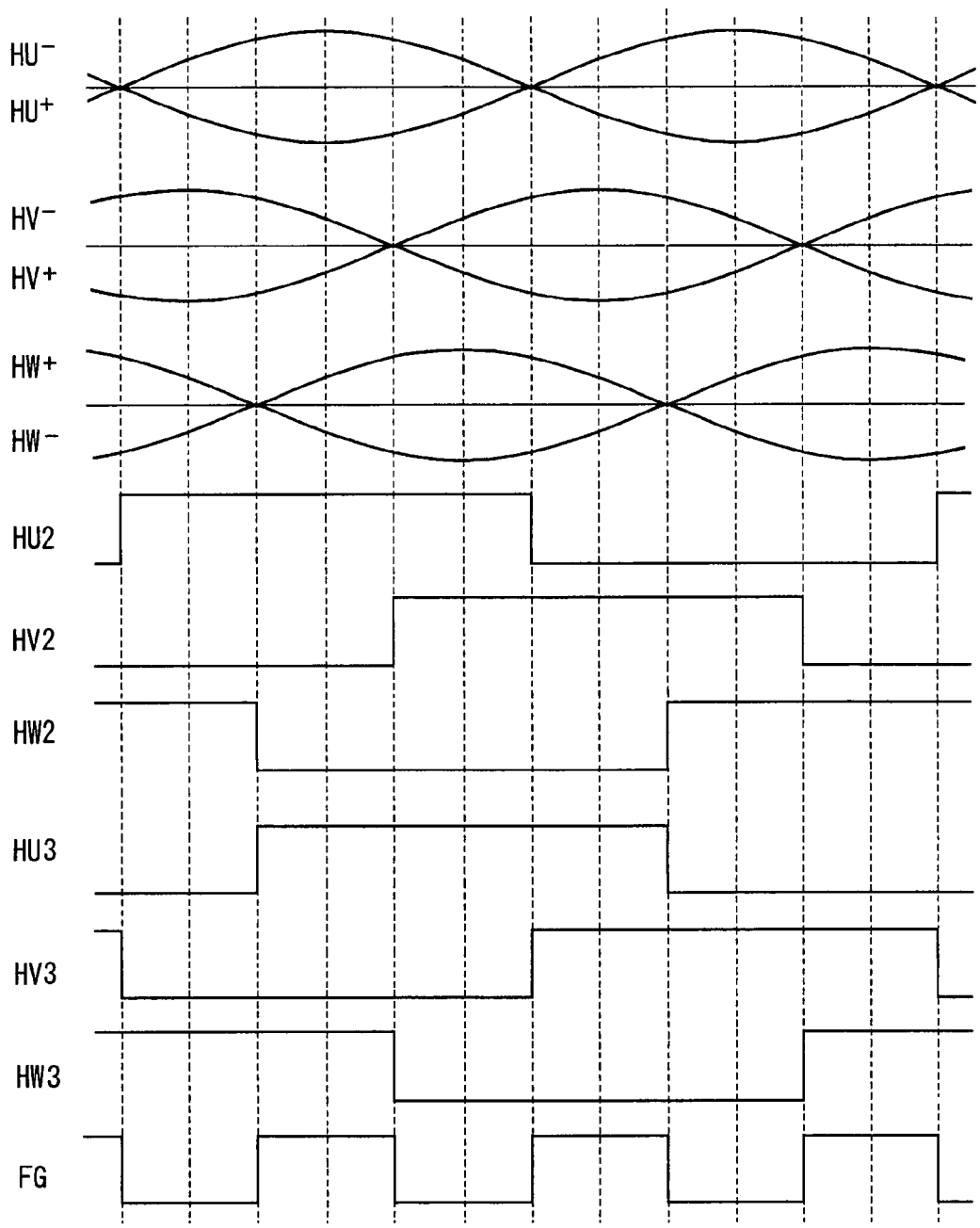
FIG. 4 is a diagram showing waveforms of rotational position signals $HU^+$, $HU^-$, $HV^+$, $HV^-$, $HW^+$, $HW^-$ having no noise superimposed thereon when a motor is rotated in a direction opposite to the case in FIG. 2.
Figure 5B:
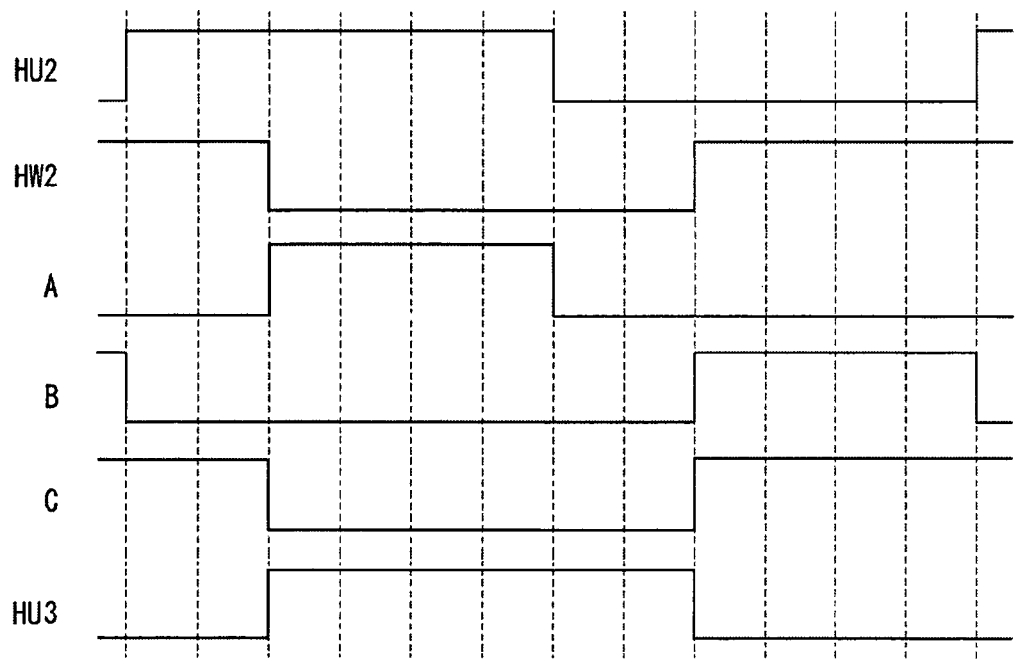
FIG. 5B is a waveform diagram illustrating an operation of the chattering preventing circuit during rotation of the motor shown in FIG. 4.

Now, it will be described that these three phase chattering preventing circuits 14, 15, 16 may be applied to a motor that rotates in the opposite direction to the case in FIG. 2. FIG. 4 shows the waveforms of rotational position signals $HU^+$, $HU^-$, $HV^+$, $HV^-$, $HW^+$, $HW^-$ having no noise superimposed thereon where the motor is rotated in the opposite direction to the case in FIG. 2. Here, the waveforms of the respective output signals HU3, HV3, HW3 of three phase chattering preventing circuits 14, 15, 16 become substantially equal to those of the respective inversion signals of pulse signals HW2, HU2, HV2. In other words, the waveforms of output signals HU3, HV3, HW3 lag electrical angle 60° behind pulse signals HU2, HV2, HW2, respectively. It is noted that although the internal operations of three phase chattering preventing circuits 14, 15, 16 will not be described in detail, the internal operation of U-phase chattering preventing circuit 14, for example, is as shown in FIG. 5B.

Furthermore, a waveform of each portion is not specifically shown in the figure where a noise close to ½ of the amplitude of rotational position signals $HU^+$, $HU^-$, $HV^+$, $HV^-$, $HW^+$, $HW^-$ is superimposed. Here, as described with reference to FIG. 3, the respective output signals HU3, HV3, HW3 of three phase chattering preventing circuits 14, 15, 16 become equal in frequency to rotational position signals $HU^+$, $HU^-$, $HV^+$, $HV^-$, $HW^+$, $HW^-$. As a result, generation of a rotation number pulse signal indicating an erroneous number of rotations is suppressed.

Figure 7:
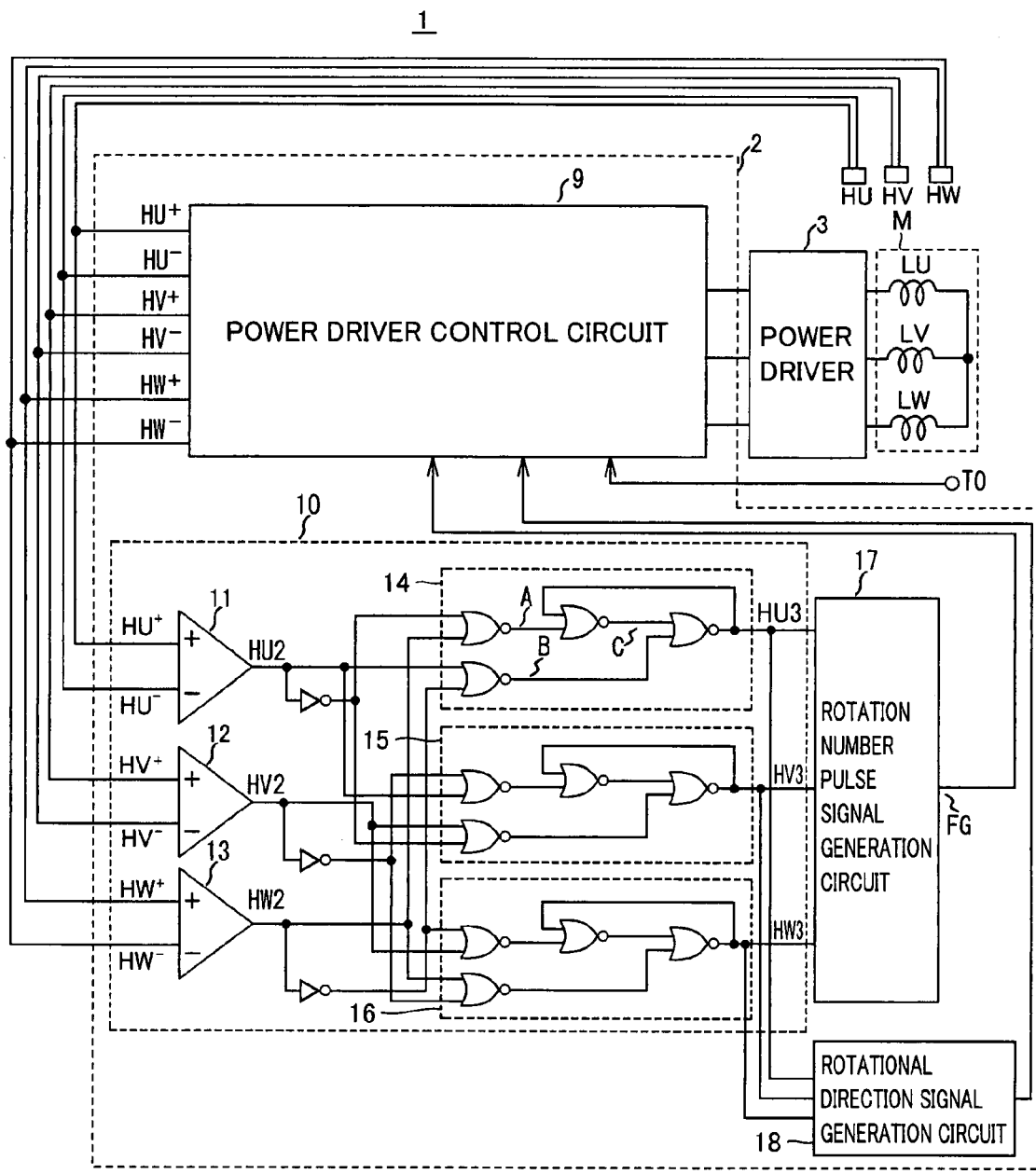
FIG. 7 is a circuit diagram showing a motor drive control circuit including a rotational direction signal generation circuit.

As shown in FIG. 7, three-phase motor drive control circuit 2 may additionally include a rotational direction signal generation circuit 18 generating a rotational direction signal indicating a rotational direction of motor M from the respective output signals HU3, HV3, HW3 of chattering preventing circuits 14, 15, 16. For example, in the rising of output signal HU3, output signal HV3 is at a high level in FIG. 2 and output signal HV3 is at a low level in FIG. 4. Thus, rotational direction signal generation circuit 18 is configured to hold the level of output signal HV3 in response to the rising of output signal HU3 so that a rotational direction signal indicating a rotational direction of motor M can be generated. It is noted that a variety of other circuit configurations may be contemplated.

Although the motor drive control circuit as an embodiment of the present invention has been described above, the present invention is not limited to the one illustrated in the embodiment and may include various design changes within the scope of the recitations in the claims. For example, three phase comparators 11, 12, 13 may be circuits that respectively compare positive rotational position signals $HU^+$, $HV^+$, $HW^+$ with a prescribed reference voltage. Furthermore, the chattering preventing circuit and the waveform shaping circuit including the same in the embodiment of the present invention may be used not only in a motor drive control circuit but also in a control circuit receiving at least two-phase sinusoidal signal having a phase difference of 60° or greater.

Here, the first, second, third comparators in the present invention correspond to any of three phase comparators 11, 12, 13 and the first, second, third chattering preventing circuits correspond to any of three phase chattering preventing circuits 14, 15, 16. For example, the first comparator is U-phase comparator 11, the second comparator is W-phase comparator 13, and the third comparator is V-phase comparator 12. In addition, the first chattering preventing circuit is U-phase chattering preventing circuit 14, the second chattering preventing circuit is W-phase chattering preventing circuit 16, and the third chattering preventing circuit is V-phase chattering preventing circuit 15. In this case, the first-phase rotational position signal is positive U-phase rotational position signal $HU^+$ or negative U-phase rotational position signal $HU^-$, the second-phase rotational position signal is positive W-phase rotational position signal $HW^+$ or negative W-phase rotational position signal $HW^-$, and the third-phase rotational position signal is positive V-phase rotational position signal $HV^+$ or negative V-phase rotational position signal $HV^-$. In addition, the first pulse signal is U-phase pulse signal, the second pulse signal is W-phase pulse signal, and the third pulse signal is V-phase pulse signal.

It should be understood that the embodiment disclosed herein is illustrative rather than limitative in all respects. The scope of the present invention is shown not in the foregoing description but in the claims, and all modifications within the meaning and range of equivalency of the claims are intended to be embraced here.

What is claimed is:

1. A waveform shaping circuit comprising:
    a first comparator generating and outputting a first pulse signal from a first-phase rotational position signal;
    a second comparator generating and outputting a second pulse signal from a second-phase rotational position signal;
    a third comparator generating and outputting a third pulse signal from a third-phase rotational position signal;
    a first chattering preventing circuit receiving said first and second pulse signals and preventing chattering of a first output, said first chattering preventing circuit holding a level of said first output changed in response to a first rising of said first pulse signal when a level of said second pulse signal is a prescribed level, and holding a level of said first output changed again in response to a first falling of said first pulse signal when a level of said second pulse signal is a level opposite to said prescribed level;
    a second chattering preventing circuit holding a level of a second output changed in response to a first rising of said second pulse signal when a level of said third pulse signal is said prescribed level, and holding a level of said second output changed again in response to a first falling of said second pulse signal when a level of said third pulse signal is a level opposite to said prescribed level; and a third chattering preventing circuit holding a level of a third output changed in response to a first rising of said third pulse signal when said first pulse signal is at said prescribed level, and holding a level of said third output changed again in response to a first falling of said third pulse signal when said second pulse signal is at a level opposite to said prescribed level.

2. A three-phase motor drive control circuit comprising:

a power driver control circuit receiving first-phase, second-phase and third-phase rotational position signals of a three-phase motor, a command signal, and a rotation number pulse signal indicating a number of rotations, and outputting a control signal for motor drive; and a waveform shaping circuit shaping waveforms of said first-phase, second-phase and third-phase rotational position signals, said waveform shaping circuit including a first comparator generating and outputting a first pulse signal from said first-phase rotational position signal, a second comparator generating and outputting a second pulse signal from said second-phase rotational position signal, a third comparator generating and outputting a third pulse signal from said three-phase rotational position signal, a first chattering preventing circuit receiving said first and second pulse signals and preventing chattering of a first output signal, said first chattering preventing circuit holding a level of said first output signal changed in response to a first rising of said first pulse signal when a level of said second pulse signal is a prescribed level, and holding a level of said first output signal changed again in response to a first falling of said first pulse signal when a level of said second pulse signal is a level opposite to said prescribed level, a second chattering preventing circuit holding a level of a second output signal changed in response to a first rising of said second pulse signal when a level of said third pulse signal is said prescribed level, and holding a level of said second output signal changed again in response to a first falling of said second pulse signal when a level of said third pulse signal is a level opposite to said prescribed level, a third chattering preventing circuit holding a level of a third output signal changed in response to a first rising of said third pulse signal when said first pulse signal is at said prescribed level, and holding a level of said third output signal changed again in response to a first falling of said third pulse signal when said second pulse signal is at a level opposite to said prescribed level, and a rotation number pulse signal generation circuit generating a rotation number pulse signal from said first output signal of said first chattering preventing circuit for output to said power driver control circuit.

3. The three-phase motor drive control circuit according to claim 2, wherein said rotation number pulse signal generation circuit generates said rotation number pulse signal additionally using said second and third output signals.

4. The three-phase motor drive control circuit according to claim 3, wherein said first-phase, second-phase and third-phase rotational position signals are signals output by first, second and third Hall elements, respectively.

5. The three-phase motor drive control circuit according to claim 4, further comprising a rotational direction signal generation circuit generating a rotational direction signal indicating a rotational direction of said motor at least from said first and second output signals.

6. The three-phase motor drive control circuit according to claim 3, further comprising a rotational direction signal generation circuit generating a rotational direction signal indicating a rotational direction of said motor at least from said first and second output signals.

7. The three-phase motor drive control circuit according to claim 2, wherein said first-phase, second-phase and third-phase rotational position signals are signals output by first, second and third Hall elements, respectively.

8. The three-phase motor drive control circuit according to claim 7, further comprising a rotational direction signal generation circuit generating a rotational direction signal indicating a rotational direction of said motor at least from said first and second output signals.

9. The three-phase motor drive control circuit according to claim 2, further comprising a rotational direction signal generation circuit generating a rotational direction signal indicating a rotational direction of said motor at least from said first and second output signals.

10. The three-phase motor drive control circuit according to claim 2, wherein said first-phase, second-phase and third-phase rotational position signals are signals output by first, second and third Hall elements, respectively.

* * * * *